United States Patent [19]

Akamatsu et al.

[11] 4,149,867

[45] Apr. 17, 1979

[54] METHOD OF PRODUCING AN OPTICAL FIBER

[75] Inventors: Takeshi Akamatsu, Nishinomiya; Koji Okamura, Kakogawa, both of Japan

[73] Assignee: Fujitsu Limited, Japan

[21] Appl. No.: 811,619

[22] Filed: Jun. 30, 1977

[30] Foreign Application Priority Data

Jul. 5, 1976 [JP] Japan .................................. 51-78866
Nov. 1, 1976 [JP] Japan ................................ 51-132170

[51] Int. Cl.² ............................................... G02B 5/14
[52] U.S. Cl. ....................................... 65/3 A; 427/163
[58] Field of Search .................. 427/163; 65/3 R, 3 A

[56] References Cited

U.S. PATENT DOCUMENTS

3,933,454 1/1976 De Luca ............................ 427/163 X

*Primary Examiner*—James R. Hoffman
*Attorney, Agent, or Firm*—Staas & Halsey

[57] ABSTRACT

An improved method of producing an optical fiber with a low transmission loss for use in an optical communication system. The method comprises a chemical vapor deposition process wherein starting materials in gas phase are oxidized to form a soot on a glass substrate, and the soot which deposits on the substrate is vitrified in an atmosphere of an inert gas which is easily dissolved in the vitrified glass. A preferable soot contains silicon dioxide, a first dopant for effecting an increase of the refraction index of the silicon dioxide and a second dopant for effecting a reduction of the vitrification temperature of the soot.

26 Claims, 1 Drawing Figure

U.S. Patent          Apr. 17, 1979          4,149,867
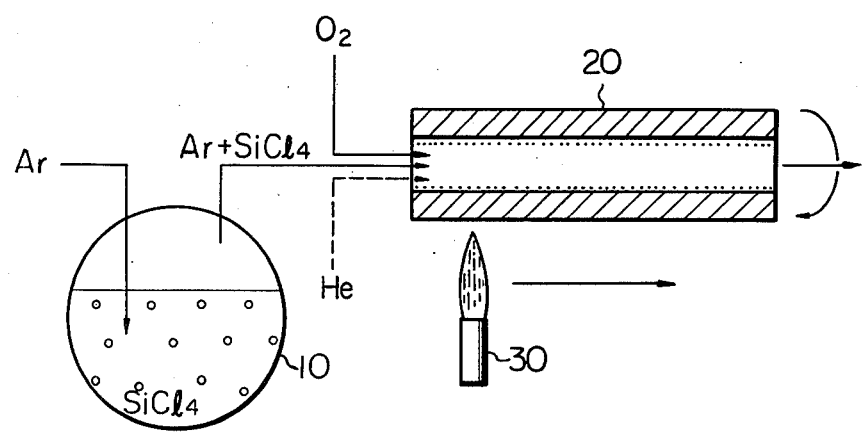

METHOD OF PRODUCING AN OPTICAL FIBER

BACKGROUND OF THE INVENTION

Field of the Invention

The present invention relates to a method of producing an optical fiber with a low transmission loss for use in an optical communication system. More particularly the present invention is directed to a method of producing a "preform rod" comprising a core glass and a cladding glass by applying a chemical vapor deposition process, which rod is then heated and drawn to form a fiber.

This particular method, in general, has the advantage that an optical fiber with low transmission loss, that is, without unreasonable attenuation of light, can be provided. This is because the process, from generation of vapors of the glass materials to formation of the core glass layer, is carried out in a closed system, with the result that doping of water and other impurities into the glass is avoided.

DESCRIPTION OF THE INVENTION

The attached drawing is a diagrammatic view showing a chemical vapor deposition process according to the present invention. However, to begin with, the conventional method of producing a preform rod by chemical vapor deposition will now be described with reference to the drawing in order to make clear the disadvantages, or the problems, involved in the conventional method.

In the FIGURE, 10 is a gas generator which contains a first starting material of liquid silicon tetrachloride ($SiCl_4$). In the generator 10, a carrier gas, argon (Ar), is bubbled to carry the gas originating from the liquid. The amount of carried gas is determined by the vapor pressure of the liquid at the temperature of the liquid and the flow rate of the carrier gas. The argon carrying the starting material gas is introduced into a tube reactor 20 through a conduit (shown schematically). The reactor 20 is a silica glass tube which is to be used as the cladding glass layer of the preform rod. The preform rod has a composition of silicon dioxide ($SiO_2$) and at least one kind of dopant for controlling the refraction index of the silica glass. A second starting material in gas phase comprising the above dopant, such as germanium tetrachloride ($GeCl_4$), is introduced together with the first starting material in gas phase from a separate gas generator containing the second material in liquid phase (not shown). This is accomplished by bubbling a carrier gas, argon, in the same manner as in the generator 10. Further, oxygen ($O_2$) gas is supplied as a reactant gas into the tube reactor 20. Of course, in some cases such starting material gases may be generated from a gas generator where the liquid mixture of the starting materials is contained by bubbling a carrier gas through the generator.

The reactor 20 is mounted in a lathe used in making glass products, for rotation at a predetermined speed. While the reactor is rotated, its outer surface is partially heated by a burner 30, such as an oxygen-hydrogen flame burner, which moves axially along the tube reactor. In this manner, the local zone of the reactor surface being heated is shifted spirally around the circumference of the reactor and over the length thereof.

The starting materials fed into the tube reactor are reacted with the introduced oxygen to form a "soot", that is, minute glass particles with a composition of a main glass material $SiO_2$ and a dopant $GeO_2$, while the tube reactor is heated in the above manner. The particles of the produced soot are then deposited on the inside wall of the reactor in the area forward but adjacent to the point where the soot has been produced, that is, in the area which has not yet been heated by the flame. The amount of soot or the thickness of the soot layer per unit area of inner surface basically depends on: the flow rate of all the gases passing through the reactor per unit of cross-sectional area of the fluid passage in the reactor, (A), and on the flow rate of the starting material gases and the carrier gases per unit of cross-sectional area of the fluid passage in the reactor, (B). That is, if the flow rate (B) is increased while maintaining the flow rate (A) at a constant value, the amount of the produced oxides in the form of soot is increased, and thus, the thickness of soot layer is increased. If the flow rate (A) is increased by increasing the oxygen feed while maintaining the flow rate (B) at a constant value, the deposition area of the produced soot spreads toward the forward direction so that the thickness of the soot layer is reduced.

The deposited soot is heated to a high temperature of 1900° C. to 2000° C. by the flame of the burner which is shifted along where the soot is deposited, and the soot is fused to form a glass. The produced glass layer has a reduced thickness, compared with the soot layer. The degree of heating by the shifting flame depends on the gas pressure of the oxygen-hydrogen producing the flame and the shifting velocity of the flame. That is, if the shifting velocity is increased at a constant gas pressure, the heat energy imparted to a local zone of the tube reactor is reduced. If the gas pressure is increased at a constant shifting velocity, the heat energy imparted to a local zone of the reactor is increased.

If the rate of heat energy imparted to a local region of the reactor is excessively high, the glass of the reactor directly subjected to the flame is softened before the fusing of the sooth within the reactor is completed. This results in the reactor being deformed and/or the gases in the flame being doped into the reactor glass. This is not desirable for the tube reactor which is to be used as a cladding glass layer in the preform rod.

If the heat energy is only slightly excessive, but enough to oxidize the starting gas materials, complete vitrification of the deposited soot is not effected. Therefore, the flame gas pressure and the shifting velocity of the burner must be set so that the heat energy imparted to the silica glass reactor is enough to effect complete vitrification of the deposited soot layer, and with substantially complete oxidation, without any damage to the reactor.

According to the conventional method, the chemical vapor deposition process is carried out as follows. The flame is shifted along the reactor from the gas input end to the output end thereof to effect formation of the soot, deposition of the soot and vitrification of the soot layer all over the length of the reactor and all around the circumference of the inner surface of the reactor. As a result, a first layer of core glass for the preform rod is provided. Then, the burner is returned to the input end of the reactor rapidly enough to impart no substantial amount of the heat energy to the reactor. After that, in the same manner, the flame is shifted toward the output end of the reactor in order to form a second layer of core glass on top of the first layer. The above described flame shifting operation is repeated, while the bubbling operation continues, so that a core glass of a plurality of glass layers, each with a predetermined constant thickness, is provided over the entire inner surface of the reactor.

The hollow reactor with the resultant core glass layer is then treated to form a preform rod as follows. The entire outer surface of the reactor is heated and the reactor is drawn until the longitudinal hollow of the reactor collapses. As a result, a preform rod consisting of a solid core glass surrounded by cladding glass is obtained. The produced preform rod is then heated and drawn, to form a continuous optical fiber consisting of a core glass and a cladding glass, in a drawing process subsequent to the preforming process.

When the conventional method mentioned above is employed, there is a limitation in the thickness of each layer of the core glass produced by each flame shifting operation, if a core glass of high quality is required. Otherwise, it is possible to increase the thickness of each layer of the deposited soot by feeding the starting materials and oxygen at increased flow rates, and to impart an increased heat energy, which is obtained by retarding the shifting flame, so that the soot layer with the resultant increased thickness is completely vitrified. However, in such case, the produced glass layer contains so many voids that its quality is not suitable for optical communication. That is, if the preform rod has a core glass with many voids, when the preform rod is drawn to form a fiber, the fiber has a tendency to break during the drawing process. Further, the light loss incurred in such fiber is high. Therefor, it is necessary to set the thickness of each layer of the deposited soot at a low value, in order to produce a core glass without any voids. This requires for the production of a preform rod, having a core glass of a predetermined thickness, the repeating of the flame shifting operation many times under the condition of reduced flow rates of the material gases.

In practice, a tube reactor having a length of about 40 cm long is used, and an oxygen-hydrogen flame is shifted at a velocity of about 5 cm/min in order to form a core glass layer in the reactor with a thickness of about 10 μm at each flame shifting operation.

In this case, the flow rates of the introduced gases are maintained at low values so that the thickness of each soot layer is reduced and each core glass layer has the predetermined thickness. Thus, if it takes eight minutes to carry out each flame shifting operation and it is necessary to repeat the operation in order to produce a core glass of the required thickness, a relatively long time of 400 minutes is required to produce the core glass.

SUMMARY OF THE INVENTION

In view of the above mentioned facts, it is strongly desired to provide an improved method by which a core glass layer of high quality and with a considerably large thickness, compared with that of the conventional case, can be obtained by each flame shifting operation, Such a method would have the advantage that the number of flame shifting operations and the time required to form a final core glass of a predetermined thickness would be considerably decreased compared with the conventional method. This advantage leads to reduction of the cost incurred in production of a preform rod.

In general, a method of forming a preform rod by the chemical vapor deposition process is not suitable for mass production of preform rods. In this respect, a silica glass tube of a larger outer diameter with a larger thickness seems to have an advantage, if it is used as the reactor or the cladding glass. This is because in comparison to that of a smaller outer diameter with a smaller thickness and of the same length, the length of the optical fiber obtained from the preform rod formed with the larger tube is longer than that of the smaller tube. However, such a larger tube reactor requires a core glass layer with a large thickness, since the sectional configuration of a preform rod having a larger outer diameter is proportional to that of a preform rod having a smaller outer diameter, if a fiber of equal proportions, is to be produced. An increase in the thickness of the tube reactor results in deformation of the reactor before the deposited soot is vitrified. Such tendency is enhanced if the thickness of each deposited soot layer is increased. However, such defective tendency would be reduced if the improved method of the invention were employed.

An objective of the present invention is to provide an improved method by which a core glass layer of high quality and with an increased thickness can be obtained by each flame shifting operation.

According to the present invention, there is provided a method of forming a preform rod by the chemical vapor deposition process, characterized in that vitrification of the soot layer, resulting from oxidation of the starting materials in gas phase, is carried out in an atmosphere of an inert gas which is easily dissolved in a fused glass, such as a rare gas, preferably helium.

A preferable soot to be produced by the method of the present invention comprises silicon dioxide, a first dopant for effecting an increase of the refraction index of the silicon dioxide and a second dopant for effecting reduction or lowering of the vitrification temperature of the silicon dioxide or soot.

A preferable first dopant is germanium dioxide and a preferable second dopant is phosphorus pentoxide.

A preferable method of the present invention comprises: bubbling at least one carrier gas through starting materials in liquid phase to generate the starting materials into a gas phase; introducing said gas phase starting materials with said carrier gas into a tube reactor of silica glass; introducing oxygen as a reactant gas into said reactor; heating said reactor at a local zone, said zone being shifted toward the output end of the reactor along the reactor length, thereby effecting reaction of said gas phase starting materials with said oxygen to produce a soot to be deposited in the form of a layer on the inner surface of said reactor and effecting vitrification of the resultant soot layer by the fusing of said soot. The improvement of the present invention resides in the fact that an inert gas, which is easily dissolved in the fused glass, independent of said carrier gas, in introduced into said reactor. Preferably, the flow rate of said oxygen in set at a value as low as possible, but enough to effect said reaction with said starting materials in gas phase, and the gas mixture of said starting materials, said oxygen, said carrier gas and said inert gas is controlled in such a manner that it has a flow rate capable of providing a soot layer with a predetermined thickness.

DESCRIPTION OF THE PREFERRED EMBODIMENTS

Examples of the present invention, and control examples of the conventional method for comparison, are discussed below.

Table I shows reaction conditions adopted when carrying out a conventional chemical vapor deposition process method, which is referred to as Control I. In Control I a silica glass tube 40 cm long with an outer diameter of 20 mm was used as a reactor and a core glass layer of high quality was formed on the inner surface of the reactor. Table I also shows the reaction conditions adopted when carrying out the chemical vapor deposition process according to the method of the present invention, which is referred to as Example I. In Example I a tube reactor of the same kind and the same size as in Control I was used and a core glass layer of high quality was formed on the inner surface of the reactor by a flame shifting operation with the same shifting velocity as that of Control I. Table I further shows the reaction conditions adopted when carrying out another conventional chemical vapor deposition process method, which is referred to as Control II. In Control II a tube reactor of the same kind and the same size as in Control I was used and a core glass layer, of a quality inferior to but with the same thickness as that of Example I, was formed on the inner surface of the reactor by each flame shifting operation which the same shifting velocity as that of Control I.

In Control II, the core glass layer resulting from the vitrification of the deposited soot had so many voids that the core glass was not suitable for use in effective optical communications.

The superiority of the present invention to the conventional methods will become apparent from a comparison of Control I with Example I. Moreover, a comparison of Example I with Control II is advantageous for understanding the features of the present invention. In both Example I and Control II, the shifting velocities of the flames, the thicknesses of the deposited soot layers and the thicknesses of the core glass layers vitrified from the deposited soot were the same. However, the core glass according to Example I had no voids, while that of Control II had many voids. It is clear that such difference was caused by the following. In Control II, oxygen was fed at a flow rate of 2000 cc/min, while in Example I a flow rate equal to 2000 cc/min consisted of oxygen at 500 cc/min and helium at 1500 cc/min. The oxygen feed of 500 cc/min is stoichiometrically enough to react with the starting material gas mixture contain- Table I

|  | Control I | Example I | Control II |
|---|---|---|---|
| Flow rate of starting material gas, $SiCl_4$ | 60 cc/min | 300 cc/min | 300 cc/min |
| Flow rate of starting material gas mixture containing a starting material, $GeCl_4$, and a carrier gas, Ar | 40 cc/min | 200 cc/min | 200 cc/min |
| Flow rate of reactant gas, $O_2$ | 1000 cc/min | 500 cc/min | 2000 cc/min |
| Flow rate inert gas, He | 0 cc/min | 1500 cc/min | 0 cc/min |
| Shifting velocity of burner flame | 5 cm/min | 5 cm/min | 5 cm/min |
| Thickness of core glass layer produced by each flame operation | 10 $\mu$m | 50 $\mu$m | 50 $\mu$m |
| Quality of core glass layer | High quality (with no voids) | High quality (with no voids) | Low quality (with voids) |

The method used in Controls I and II were carried out in the manner previously described with reference to the drawing. Example I was also carried out in the same manner, except that helium gas was introduced into the reactor 10 as shown in the drawing by a dotted line. The reaction conditions of Control I were designed so that each core glass layer had a thickness as large as possible under the condition that the layer was ensured to be of high quality. However, the thickness of the core glass layer produced by each flame shifting operation in Control I was only 10 $\mu$m.

The reaction conditions of Example I were designed so that each core glass layer had a thickness as large as possible under the condition that the layer was ensured to be of high quality. The core glass layer produced by each flame shifting operation had a thickness five times that of Control I. As will be apparent in a comparison of Control I with Example I, Control I provided a core glass of high quality, owing to the fact that the flow rate of the starting material gas mixture containing $SiCl_4$, $GeCl_4$ and the carrier gas, Ar, was one fifth of that of Example I, and the flow rate of all of the gases is limited to 1100 cc/min. In this case, the deposited soot consisting of the oxides, $SiO_2$ and $GeO_2$, had a thickness only one fifth of that of Example I and, thus, each core glass layer had this small thickness.

The intent of carrying out the method of Control II was to provide deposited soot of the same thickness as that of Example I. That is, in Control II, the starting material gas mixture, containing $SiCl_4$, $GeCl_4$ and the carrier gas, Ar, having the same flow rate as that of Example I was employed, while all of the gases were maintained at the same flow rate of 2500 cc/min as in Example I.

ing the carrier gas at a flow rate of 500 cc/min. However, in Control II, the applied oxygen feed exceeded 500 cc/min by 1500 cc/min. This excessive oxygen feed was employed to prevent the thickness of the deposited soot from increasing. According to Example I of the present invention, instead of the excessive oxygen feed, a helium feed of the same flow rate as that of the excessive oxygen feed in Control II was employed. This means that the interior spaces within the deposited soot layer were occupied by the oxygen and the product gases resulting from the oxidation, such as chlorine gas, $cl_2$, in the case of Control II, while such spaces were occupied mainly by helium gas in the case of Example I.

It is important to note that helium gas is easily dissolved in the glass without any reaction therewith, when the soot is fused for vitrification, and that the dissolution of helium in the glass does not impair the optical characteristic of the glass. In this connection, it is understood that the helium gas occupying most of the interior spaces in the deposited soot layer is dissolved and, thus, disappears during the vitrification of the deposited soot. As a result, the interior spaces, which would be changed to voids in the fused glass in the conventional case, are reduced. The reduced interior spaces of the deposited soot layer are not occupied by a the non-dissolving reactant gases but are occupied mainly by helium so long as the interior spaces are not closed. Therefore, during the vitrification process, the reactant gases are chased from the interior of the deposited soot layer, and thus, the deposited soot layer is changed to a fused glass layer with no voids.

Irrespective of the above explanation, Table I proves the advantageous results of the present invention.

The scope of the present invention is not limited to the provision of an atmosphere of helium gas in which the deposited soot layer is vitrified. Instead of helium gas, other rare gases which are easily dissolved in the fused glass and do not react with the glass may be employed. In this connection, argon, Ar, may be employed instead of the helium gas.

Argon gas is, in general, used as a carrier gas for carrying the starting material gases, such as $SiCl_4$ and $GeCl_4$. Therefore, it would, at first, appear to be possible for the carrier gas of argon to take the place of the helium gas forming the atmosphere. However, this is not true. Further, the above mentioned helium feed would not appear to be necessary if a helium feed were used as a carrier gas feed. This is also not true. Irrespective of the kind of gas, a carrier gas has a flow rate of only a value necessary to effect generation of the starting material gases before they are introduced into the reactor. Therefore, in order to provide an atmosphere which is mostly helium or argon in the tube reactor, with the result that the proportion of the reactant gases, such as oxygen and chlorine, in the interior spaces of the deposited soot layer is reduced, it is necessary to employ a separate feed of helium or argon independent of the carrier gas feed.

Another example of the present invention is described below.

In this example, which is referred to as Example II hereinafter, a reactant gas mixture containing starting materials with carrier gases and oxygen was introduced with a helium gas feed into a silica tube reactor having an outer diameter of 20 mm and a length of 40 cm, to carry out a gas phase reaction and vitrification of the resultant product as in the previously described Example I. The introduced gases and flow rates thereof are shown in Table II below.

Table II

| Gases | Flow rates | Remarks |
| --- | --- | --- |
| He | 500 cc/min | |
| $O_2$ | 1000 cc/min | |
| $SiCl_4$ + Ar | 300 cc/min | values at 30° C. |
| $GeCl_4$ + Ar | 350 cc/min | |
| $PCl_3$ + Ar | 30 cc/min | |

Each starting material in gas phase was generated from a separate gas generator, of the type shown in the drawing, by bubbling the carrier gas, Ar, through the generator containing the starting material in liquid phase. While the gas feeds were in the reactor, the reactor was heated by an oxygen-hydrogen flame burner with a flame shifting velocity of 5 cm/min in the same manner as described in Example I. As a result, the thickness of each glass layer obtained by each flame shifting operation was about 40 $\mu$m. The flame shifting operation was repeated fifty times, and then the tube reactor with the produced core glass layer therein was collapsed to form a solid preform rod. In the preform rod, the solid core glass had a diameter of 10 mm. The preform rod was heated and drawn to form an optical fiber. The produced fiber had a length of about 10 km, an outer diameter of 125 $\mu$m and a core diameter of 62.5 $\mu$m. The numerical aperture of the fiber was 0.20.

The core glass in the fiber was composed of about 10% $GeO_2$, resulting from $GeCl_4$, about 1% $P_2O_5$, resulting from $PCl_3$, and 89% $SiO_2$, resulting from $SiCl_4$. During the flame shifting operation, no deformation of the silica tube reactor occurred. Further, no voids were seen in the produced core glass. In this Example II, $GeO_2$ was the first dopant, which was doped into the $SiO_2$ for effecting an increase of the refraction index of $SiO_2$, while $P_2O_5$ was the second dopant, which was doped into the $SiO_2$ in order to lower the vitrification temperature of $SiO_2$.

In comparison with Control I shown in Table I, the thickness of the produced core glass layer with no voids in Example II using the present invention was four times that of Control I. This advantage of the present invention results from a combination of use of the second dopant, for effecting reduction of the vitrification temperature of the silicon dioxide, and the provision of the atmosphere of helium, wherein the chemical vapor deposition process is carried out.

In Example II, the vitrification temperature of the deposited soot layer was lowered to about 1400° C. This lowered vitrification temperature appears to enhance the effect of helium gas due to the fact that the helium feed of a reduced flow rate of 500 cc/min and the oxygen feed of an increased flow rate of 1000 cc/min were employed, in comparison with Example I.

According to the present invention, the soot layer had an considerably increased thickness, compared with the conventional method. In this connection, it is possible to adopt the following method, instead of the above mentioned method, wherein during each flame shifting operation the soot forming process and the glass forming process were carried out. That is, it is possible to adopt a method wherein, at the first stage, only the soot forming process is carried out by repeating the flame shifting operation to form a plurality of soot layers; and, at the second stage, the soot layers piled up to predetermined thickness, for example, 1 to 1.5 mm, are heated so that the soot is vitrified. This possible method results in an advantage that the cost of production is reduced, compared with the conventional method.

What is claimed is:

1. In a method of producing an optical fiber comprising a gas phase chemcial reaction process wherein starting materials in gas phase are oxidized to form a soot so that the soot is deposited on a glass substrate and said deposited soot is vitrified by fusing; the improvement wherein the step of forming said soot and the step of vitrifying said soot are carried out simultaneously, and the oxidation of said starting materials, the deposition of said soot and the fusing of said soot take place in an atmosphere of an inert gas which is easily dissolved in said fused soot, said inert gas flowing over the length of said substrate.

2. A method of producing an optical fiber according to claim 1, wherein said soot comprises silicon dioxide, a first dopant for effecting an increase of the refraction index of the silicon dioxide and a second dopant for lowering the vitrification temperature of the silicon dioxide.

3. A method of producing an optical fiber according to claim 2, wherein said first dopant comprises germanium dioxide and said second dopant is phosphorus pentoxide.

4. A method of producing an optical fiber according to claim 1, wherein said inert gas comprises helium.

5. A method of producing an optical fiber according to claim 1, wherein said inert gas is argon.

6. A method of producing an optical fiber comprising: bubbling at least one carrier gas through at least one starting material in liquid phase to generate said starting material(s) into a gas phase; introducing said gas phase starting materials with said carrier gases into a tube reactor of silica glass; introducing a reactant gas comprising oxygen into said reactor; introducing an inert gas into said reactor, said inert gas being easily dissolved in the vitrified soot to be produced; heating said reactor at a local zone, said local zone being shifted toward the output end of said reactor along the length of said reactor, thereby effecting a reaction of said gas phase starting materials with said oxygen to produce a soot that is deposited in the form of a layer on the inner surface of said reactor and vitrifying said deposited soot layer by the fusing of said soot into glass, said soot production, deposition and vitrification occuring simultaneously as a result of said heating.

7. A method of producing an optical fiber according to claim 6 wherein: the flow rate of said oxygen is set at a value as low as possible, but enough to effect substantially said reaction with said starting materials in gas phase; and, the flow rate of the gas mixture comprising said starting materials in gas phase, said oxygen, said carrier gas and said inert gas is controlled to produce said soot layer with a predetermined thickness.

8. A method of producing an optical fiber according to claim 6 wherein said starting materials comprise silicon tetrachloride, germanium tetrachloride, and phosphorus trichloride.

9. A method of producing an optical fiber according to claim 6, wherein said inert gas is helium.

10. A method of producing an optical fiber according to claim 6, wherein said inert gas is argon.

11. The method of claim 6, said inert gas flowing the length of said tube reactor where said deposition occurs.

12. A method for producing a high quality preform rod having no voids, said method comprising flowing at least three gases into a glass tube for transfer along said tube, at least one of said gases being an inert gas which dissolves in the vitrified glass to be formed without reaction therewith, and at least two other of said gases being such as to react together upon heating to produce soot particles, and repeatedly heating said glass tube by moving a source of heat in thermal contact with said tube in the direction of said flowing gases, and heating being applied evenly overtime around the periphery of said tube during said motion, whereby each said repeated heating resulting the simultaneous formation of said soot, the deposition of said soot and the fusing of said deposited soot into an even layer of said vitrified glass without any of said voids, said layer having a predetermined thickness on the inside of said tube.

13. The method of claim 12, said motion of said heat source being in the direction of flow of said flowing gases.

14. The method of claim 12, said inert gas comprising at least one gas chosen from the group consisting of argon and helium.

15. The method of claim 12, said at least two other gases comprising oxygen and silicon tetrachloride.

16. The method of claim 15, the relative amount of said oxygen being such as to prevent the accumulation of oxygen and the product gases of said reaction from accumulating in the interstices of said deposited soot.

17. The method of claim 15, each said repeated heating producing one of said layers of said vitrified glass with a thickness of at least 20 microns.

18. The method of claim 12, comprising the step of generating at least one of said gases from the liquid state by means of passing at least one carrier gas through each said liquid state source of said gas(es).

19. The method of claim 12, said gases including at least one dopant gas for selectively increasing the index of refraction of said vitrified glass and for decreasing the temperature of said fusing.

20. The method of claim 18, said dopants comprising at least one dopant selected from the group consisting of germanium dioxide and phosphorus pentoxide.

21. The method of claim 12, said source of heat comprising a flame, said method further comprising rotating said tube and said moving of said flame comprising motion along a straight line parallel to the axis of said tube.

22. A method for forming in a closed system a high quality preform rod having no voids, said method comprising:

a first step that includes flowing at least three gases into a glass tube for transfer along the length of said tube, at least one of said gases being an inert gas which dissolves in the vitrified glass to be formed without reacting therewith, and repeatedly heating said gas tube by moving a source of heat in thermal contact with said tube in the direction of said flowing gases, said heating being applied evenly over time around the periphery of said tube during said motion, whereby each said repeated heating results in the simultaneous formation of said soot and the deposition of a layer of said soot of a predetermined thickness on the inside surface of said tube, said repeated heating and deposition continuing to form a plurality of said layers, each said deposition occuring without the inclusion of impurities from outside said closed system, and a second step including a single heating step to fuse said plurality of layers into a layer of vitrified glass.

23. The method of claim 22, said motion of said heat source being in the direction of flow of said flowing gases, and said heat source comprising a flame.

24. The method of claim 22, said inert gas comprising at least one gas chosen from the group consisting of argon and helium and said at least two other gases comprising oxygen and silicon tetrachloride.

25. The method of claim 22, each said repeated heating producing each of said deposited layers with a thickness of at least 20 microns, and said plurality of layers having a thickness of at least 0.75 millimeter.

26. The method of claim 22, wherein said single heating step of said tube comprises the same steps as each of said repeated heatings.

* * * * *

UNITED STATES PATENT AND TRADEMARK OFFICE
CERTIFICATE OF CORRECTION

PATENT NO. : 4,149,867
DATED : April 17, 1979
INVENTOR(S) : AKAMATSU ET AL.

It is certified that error appears in the above-identified patent and that said Letters Patent are hereby corrected as shown below:

Col. 2, line 40, "sooth" should be --soot--;

Col. 6, line 68, "atmospher" should be --atmosphere--;

Col. 8, line 37, "chemcial" should be --chemical--.

Signed and Sealed this

Twenty-fifth Day of September 1979

[SEAL]

Attest:

*Attesting Officer*

LUTRELLE F. PARKER
*Acting Commissioner of Patents and Trademarks*